US012452199B2

United States Patent
Alves et al.

(10) Patent No.: US 12,452,199 B2
(45) Date of Patent: Oct. 21, 2025

(54) SYSTEMS AND METHODS FOR MONITORING AND RECOVERING TRADING SYSTEM FAILURES

(71) Applicant: FMR LLC, Boston, MA (US)

(72) Inventors: Douglas Alves, Mesa, AZ (US); Jerome Xavier Jourdon, Holladay, UT (US); Colton Robert Foremaster, Lehi, UT (US); Adrienne McKenzie Eror, Salt Lake City, UT (US); Muthukumaran Subramanian, Saratoga Springs, UT (US); Rahul Digamabr Firke, East Walpole, MA (US); Brent Robert Reynolds, Hyrum, UT (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/430,018

(22) Filed: Feb. 1, 2024

(65) Prior Publication Data
US 2025/0254139 A1 Aug. 7, 2025

(51) Int. Cl.
*H04L 51/216* (2022.01)
*H04L 67/02* (2022.01)

(52) U.S. Cl.
CPC ............ *H04L 51/216* (2022.05); *H04L 67/02* (2013.01)

(58) Field of Classification Search
CPC ...... G06F 16/3344; G06F 40/30; G06F 9/541; G06F 16/182; H04L 67/10; H04L 41/0803
See application file for complete search history.

(56) References Cited

U.S. PATENT DOCUMENTS

| | | | |
|---|---|---|---|
| 11,055,072 B2 * | 7/2021 | Roy Barman | H04L 41/142 |
| 2021/0042095 A1 * | 2/2021 | Barman | H04L 41/142 |
| 2022/0374398 A1 * | 11/2022 | Cosentino | G06F 16/289 |
| 2024/0168923 A1 * | 5/2024 | Sinha | G06F 16/182 |
| 2024/0370323 A1 * | 11/2024 | Barnes | G06F 9/542 |

\* cited by examiner

*Primary Examiner* — Chirag R Patel
(74) *Attorney, Agent, or Firm* — Cesari and McKenna, LLP (57) ABSTRACT

A computerized method is provided for automatic monitoring, deserializing, cataloging, and replaying messages passing through a trading platform. Methods can include an audit micro service operable to read JSON files associated with various messages including a topic and class name attribute and create a message consumer having specific attributes based on the topic and class name attribute. The consumer can be a compiled executable operable to receive, deserialize, and store messages in a searchable database in human readable format.

20 Claims, 10 Drawing Sheets

```
[
  {
    "topic": "acct.new",
    "messageTypes": [
      {
        "publisherName": "Customer",
        "className": "NewAccount",
        "messageTypeId": 1
      }
    ]
  },
  {
    "topic": "acct.rest",
    "messageTypes": [
      {
        "publisherName": "Customer",
        "className": "AccountRestrictions",
        "messageTypeId": 2
      }
    ]
  }
]
```

FIG. 7

```
Syntax = "proto3";

Import "MessageHeader.proto";

Message NewAccount { int64 accountNumber    =1;
  string aoStatus        =2;
  string createTs        =3;
  string updateTs        =4;

| Kafka Messages | | | | | | | | | |
|---|---|---|---|---|---|---|---|---|---|
| | | | | Playback Selected | Download This Page | Download Selected | | Edit Columns | |
| Actions | Kafka Timestamp | Audit Consumer Timestamp | Topic | Message Type | Message Version | Message ID | Publisher ID | Correlation ID | Log Trace ID |
| 🔗 | 2022-02-16 11:32:49 | 2022-02-16T11:32... | gm.pier.preprod.a... | 600 OWS_INCIDENT | 1 | | 1 Customer | - | 5cbf3b1be554b4c |
| 🔗 | 2022-02-23 17:19:08 | 2022-02-23T17:19... | gm.pier.preprod.a... | 600 OWS_INCIDENT | 1 | | 1 Customer | - | 0524d1f44a02cf4c |
| 🔗 | 2022-03-02 13:30:04 | 2022-03-02T13:30... | gm.pier.preprod.a... | 600 OWS_INCIDENT | 1 | | 1 Customer | - | 3ec44d077a5c862 |

FIG. 9

| Actions | Kafka Timestamp | Audit Consumer Timestamp | Topic | Message Type | Message |
|---|---|---|---|---|---|
| 🔗 | 2022-02-16 11:32:49 | 2022-02-16T 16:32... | gm.pier.preprod.a... | 600 OWS_INCIDENT | 5cbf3b1b |
| 🔗 | 2022-02-23 17:19:08 | 2022-02-23T 22:19... | gm.pier.preprod.a... | 600 OWS_INCIDENT | 0524d1f4 |
| 🔗 | 2022-03-02 13:30:04 | 2022-03-02T 18:30... | gm.pier.preprod.a... | 600 OWS_INCIDENT | 0524d1f4 |
| 🔗 | 2022-03-02 13:44:25 | 2022-03-02T 18:44... | gm.pier.preprod.a... | 600 OWS_INCIDENT | 18452963 |
| 🔗 | 2022-03-02 13:10:42 | 2022-03-02 18:10... | gm.pier.preprod.a... | 600 OWS_INCIDENT | 6b29c275 |
| 🔗 | 2022-03-02 13:20:24 | 2022-03-02 18:20... | gm.pier.preprod.a... | 600 OWS_INCIDENT | 0702c5dc |
| 🔗 | 2022-03-02 13:21:27 | 2022-03-02 18:21... | gm.pier.preprod.a... | 600 OWS_INCIDENT | 61003be4 |

FIG. 10

Collapse ALL
   _index: "pier_audit_ams"
   _type: "_doc"
   _id: "U-1hA38B5Yk09wEdLtB0"
   _score: null
   _ignored:
      0: "message.entitypayload.keyword"
   _source:
      timestamp: "2022-0216T16:32:54.562z"
      message:
         messageType: "600 OWS_INCIDENT"
         messageVersion: "1"
         messageId: "5cbf3b1be554b4c1"
         publisherId: "1 Customer"
         correlationId: " "
         logTraceId: "5cbf3b1be554b4c1"
         isPlayback: "false"
      eventtimestampAms: "2022-02-16T16:32:49.371z"
      eventtimestamp:
         seconds: "1645029169"
         nanos: "371000000"

FIG. 10 (CONTINUED)

| Kafka Messages | | | | | | | | | Playback Selected | Download This Page | Download Selected | Edit Columns |
|---|---|---|---|---|---|---|---|---|---|---|---|---|
| Actions | Kafka Timestamp | Audit Consumer Timestamp | Topic | Message Type | Message Version | Message ID | Publisher ID | Correlation ID | Log Trace ID |
| 🔗 | 2022-02-16 11:32:49 | 2022-02-16T11:32... | gm.pier.preprod.a... | 600 OWS_INCIDENT | 1 | | 1 Customer | | 5cbf3b1be554b4c |

FIG. 11

… # SYSTEMS AND METHODS FOR MONITORING AND RECOVERING TRADING SYSTEM FAILURES

TECHNICAL FIELD

This application relates generally to systems, methods and apparatuses, including computer program products, for monitoring and recovering trading system failures.

BACKGROUND

Many financial trading software applications, tools, and platforms have appeared in recent years. These platforms have provided unprecedented access for individual consumers to easily execute trades and monitor markets. Individuals can now monitor and execute trades from their computers and even their mobile devices at any time. Accordingly, the volume of trade and other messages passing through these electronic trading platforms has increased. Unfortunately, as with all systems, errors can happen and for various reasons, an administrator may wish to search and review the trade instructions and other messages passing through the trading platform. Unfortunately, these messages are often in machine-readable languages and, when combined with their shear volume, make searching and reviewing extremely difficult.

SUMMARY

Systems and methods described herein provide automatic monitoring, deciphering, and recovery of messages in a trading platform. In various embodiments, dedicated message consumers deserialize trade instructions and confirmations and any other messages passing through an electronic trading platform. The messages are thereby translated into human-readable language so that a user can understand the message details at a glance. The deserialized, human-readable messages can be stored in a searchable database for review, searching, and other manipulation. A user interface can be provided to allow an administrator or other authorized user to sort, search, or filter messages based on various criteria and view the human-readable messages stored therein. The audit microservice can even replay messages such as failed trade executions to recover trade failures. Messages can be replayed individually or in a batch (e.g., all messages from a certain time frame during which the trade system was down).

The process of creating message consumers can be automated. The developer introducing a new topic, only needs to add the required information for message deserialization in the first JSON file, allowing the platform to have unlimited numbers of consumers running in the background without having any manual intervention for the creation of consumers. The audit micro system is operable to read the JSON file and, based on the information therein, determine the number of topics for which a dedicated consumer should be created. Each topic may include one or more class name attributes that the audit micro system can map to a corresponding protocol buffer that defines the appropriate deserializing steps for the respective message consumer to use in creating and storing it's consumed messages in human-readable format.

Aspects of the invention can include a computerized method for automatic monitoring and cataloging of messages. Methods may include providing an audit micro service in electronic communication with a trading platform; routing messages comprising a JavaScript Object Notation (JSON) file from the trading platform to the audit micro service, wherein the JSON file comprises one or more topics and a corresponding class name attribute for each topic; reading the JSON file with the audit micro service; for each topic, mapping, with the audit micro service, the corresponding class name attribute to a protocol buffer to determine consumer attributes for the corresponding class name attribute; and creating, with the audit micro service, a consumer for each topic comprising the determined consumer attributes, wherein the consumer is a compiled executable operable to receive, deserialize, and store messages in a searchable database in human readable format.

In certain embodiments, methods may include resending an individual message stored in the searchable database to execute intended operations of the individual message. Methods of the invention can further comprise resending a plurality of messages stored in the searchable database based on a selected timeframe in which the plurality of messages were originally sent within the trading platform. In some embodiments, resending the message may occur where the individual message failed to execute its intended operation when originally sent within the trading platform. Methods can further comprise verifying that the individual message failed to execute its intended operation when originally sent within the trading platform before resending the individual message.

In various embodiments, methods of the invention can include providing a user interface displaying the searchable database of stored messages in human readable format. The protocol buffer can comprise a serialized data format for translating messages of the corresponding class name. Methods may include monitoring status of the created consumers. In some embodiments, methods can include automatically restarting the created consumers after unexpected failure. Deserializing messages in the searchable database in human readable format can comprise first deserializing a header of the messages and then deserializing the entire message based on a message type read from the deserialized header.

In certain aspects, systems of the invention can include a computer system for automatic monitoring and cataloging of messages with the system comprising an audit micro service and a computerized trading platform operable to route messages comprising a JavaScript Object Notation (JSON) file from the trading platform to the audit micro service, wherein the JSON file comprises one or more topics and a corresponding class name attribute for each topic. The audit micro service can be operable to read the JSON file; for each topic, map the corresponding class name attribute to a protocol buffer to determine consumer attributes for the corresponding class name attribute, and create a consumer for each topic comprising the determined consumer attributes, wherein the consumer is a compiled executable operable to receive, deserialize, and store messages in a searchable database in human readable format. In various embodiments systems of the invention can be operable to perform any and all of the aforementioned methods.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
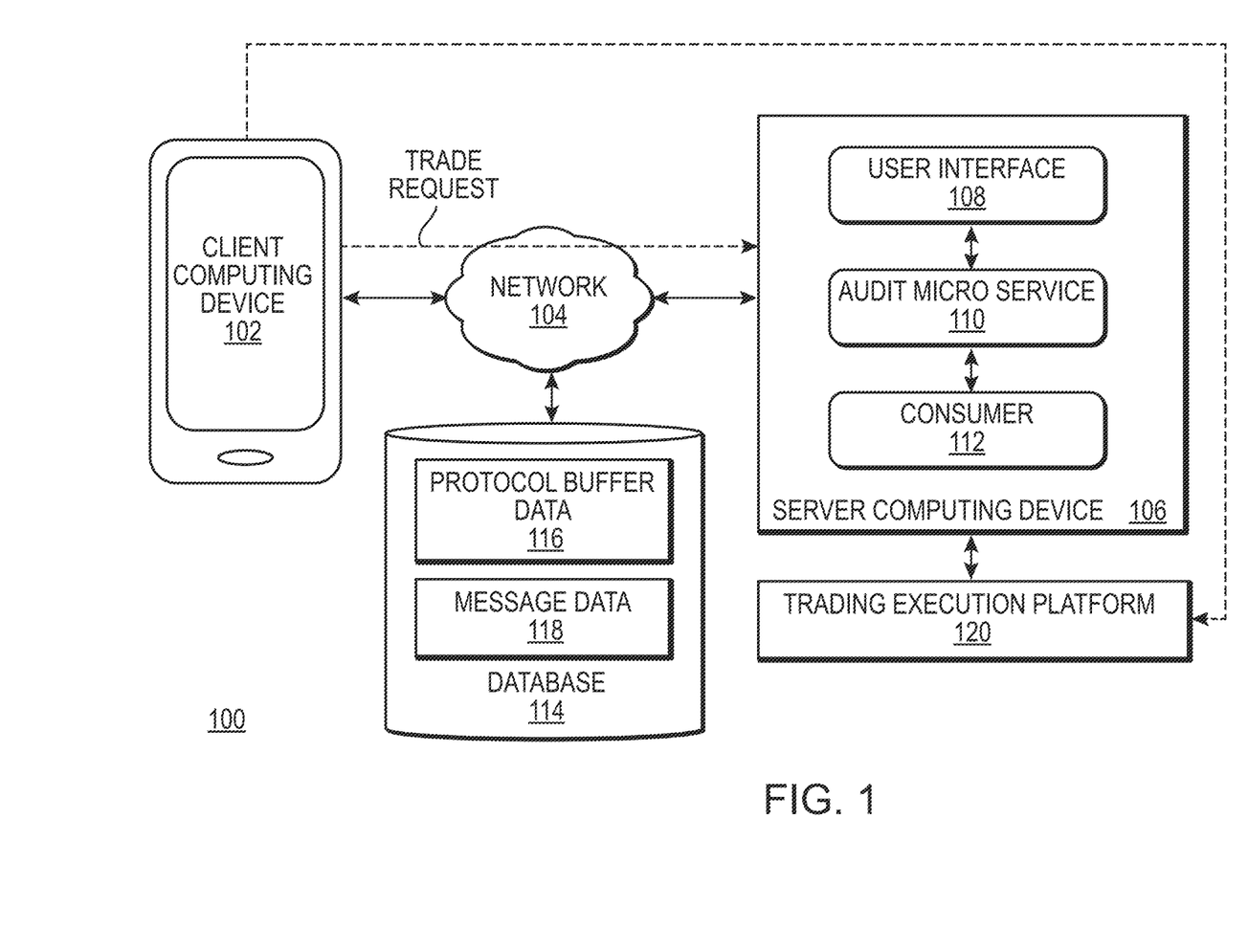
FIG. 1 is a block diagram of a system for automatic monitoring and cataloging of messages.

FIG. 1 is a block diagram of a system 100 for automatic monitoring and cataloging of messages. The system 100 includes a client computing device 102, a communications network 104, a server computing device 106 that includes a user interface module 108, an audit micro service module 110 and one or more consumer modules 112 created by the audit micro service module 110, a database 114 that includes protocol buffer data 116 and message data 118, and a trading execution platform 120.

The client computing device 102 connects to one or more communications networks (e.g., network 104) in order to communicate with the server computing device 106 to provide input and receive output relating to execution of trades or other functions related to a trading account. Exemplary client computing devices 102 include but are not limited to server computing devices, desktop computers, laptop computers, tablets, mobile devices, smartphones, and the like. Typically, the client computing device 102 includes a display device (not shown) that is embedded in and/or coupled to the client computing device for the purpose of displaying information to a user of the device. It should be appreciated that other types of computing devices that are capable of connecting to the components of the system 100 can be used without departing from the scope of invention. Although FIG. 1 depicts one client computing device 102, it should be appreciated that the system 100 can include any number of client computing devices.

In some embodiments, the client computing device 102 can execute one or more software applications that are used to provide input to and receive output from the server computing device 106. For example, the client computing device 102 can be configured to execute one or more native applications and/or one or more browser applications. Generally, a native application is a software application (in some cases, called an 'app') that is installed locally on the client computing device 102 and written with programmatic code designed to interact with an operating system that is native to the client computing device 102. Such software may be available from, e.g., the Apple® App Store, the Google® Play Store, the Microsoft® Store, or other software download platforms depending upon, e.g., the type of device used. In some embodiments, the native application includes a software development kit (SDK) module that is executed by a processor of the client computing device 102 to perform functions associated with trade requests and otherwise communicate with the trading execution platform 120. Generally, a browser application comprises software executing on a processor of the client computing device 102 that enables the client computing device to communicate via HTTP or HTTPS with remote servers addressable with URLs (e.g., server computing device 106) to receive website-related content, including one or more webpages, for rendering in the browser application and presentation on the display device coupled to the client computing device 102. Exemplary mobile browser application software includes, but is not limited to, Firefox™, Chrome™, Safari™, and other similar software. The one or more webpages can comprise visual and audio content for display to and interaction with a user.

The communications network 104 enables the client computing device 102 to communicate with the server computing device 106. The network 104 is typically comprised of one or more wide area networks, such as the Internet and/or a cellular network, and/or local area networks. In some embodiments, the network 104 is comprised of several discrete networks and/or sub-networks (e.g., cellular to Internet).

The server computing device 106 is a device including specialized hardware and/or software modules that execute on a processor and interact with memory modules of the server computing device 106, to receive data from other components of the system 100, transmit data to other components of the system 100, and perform functions for automatic monitoring, deciphering, and cataloging of messages passing through the trading execution platform. The server computing device 106 includes a user interface module 108 an audit microservice module 110, and one or more consumer modules 112 created by the audit microservice module that execute on the processor of the server computing device 106. In some embodiments, the modules 108, 110, and 112 are specialized sets of computer software instructions programmed onto one or more dedicated processors in the server computing device 106 and can include specifically designated memory locations and/or registers for executing the specialized computer software instructions.

Although the computing modules 108, 110, and 112 are shown in FIG. 1 as executing within the same server computing device 106, in some embodiments the functionality of the computing modules 108, 110, and 112 can be distributed among a plurality of server computing devices. As shown in FIG. 1, the server computing device 106 enables the computing modules 108, 110, and 112 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the computing modules 108, 110, and 112 is described in detail throughout this specification.

The database 114 is a computing device (or in some embodiments, a set of computing devices) coupled to the server computing device 106 (in some embodiments, via communications network 104) and is configured to receive, generate, and store specific segments of data relating to the process of automatic deciphering, monitoring, and cataloging messages passing through the trading execution platform 120. In some embodiments, all or a portion of the database 114 can be integrated with the server computing device 106 or be located on a separate computing device or devices. The database 114 can comprise one or more databases configured to store portions of data used by the other components of the system 100, as will be described in greater detail below.

In some embodiments, the database 114 comprises protocol buffer data 116 and message data 118. Generally, the protocol buffer data 116 comprises data and metadata associated with message data formats. The protocol buffer data 116 can include, but is not limited to, one or more attributes a message consumer should contain for a given class of messages. As can be appreciated, these attributes can allow for message consumers generated by the audit micro service 110 to correctly deserialize messages passing through the trading execution platform 120. Exemplary technical indicators include heuristic or mathematical calculations based on the price, volume, or open interest of a security or other financial instrument.

Generally, the message data 118 comprises the human readable message information deserialized and stored by the generated message consumers 112 from messages passing through the trading execution platform 120. These human readable messages can be searched, sorted, reviewed, resent, and otherwise manipulated automatically by the audit micro service 110 or by manually by a user through the user interface 108. For example, a user may filter and/or sort messages related to trades that failed to process for various reasons. The user can then select and replay or resend those messages via the user interface 108 to the trade execution platform to accomplish the trade. Such failed trade or other messages may also be automatically identified, flagged, and/or replayed by the audit microservice where desired.

The trading execution platform 120 comprises one or more computing devices (such as server computing devices) that are coupled to the server computing device 106 in order to receive trade execution signals from a client computing device or other sources and execute one or more trades of financial instruments based upon the trade execution signals for, e.g., a particular user or users of the system 100.

Figure 2:
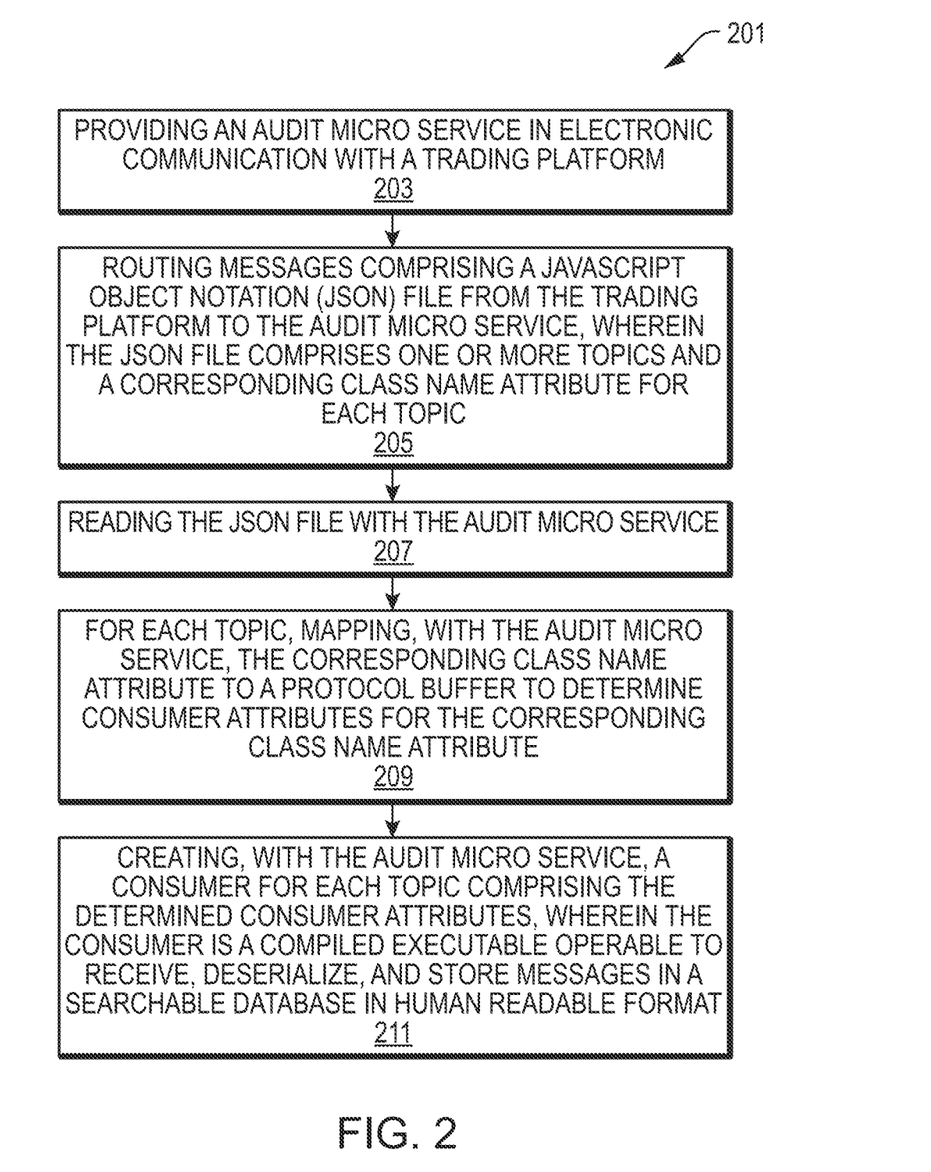
FIG. 2 shows an exemplary method for automatic monitoring and cataloging of messages.

FIG. 2 shows an exemplary method 201 for automatic monitoring and cataloging of messages. An audit micro service is provided 203 in electronic communication with a trading platform 103. Messages passing through the trading platform are routed 205 to the audit micro service. Messages can include, for example, trade requests, account creation or changes, and funding changes. Messages in the trading platform include a JavaScript Object Notation (JSON) file containing certain information about the message including one or more message topics and a class name attribute for each of those one or more message topics.

Figure 7:
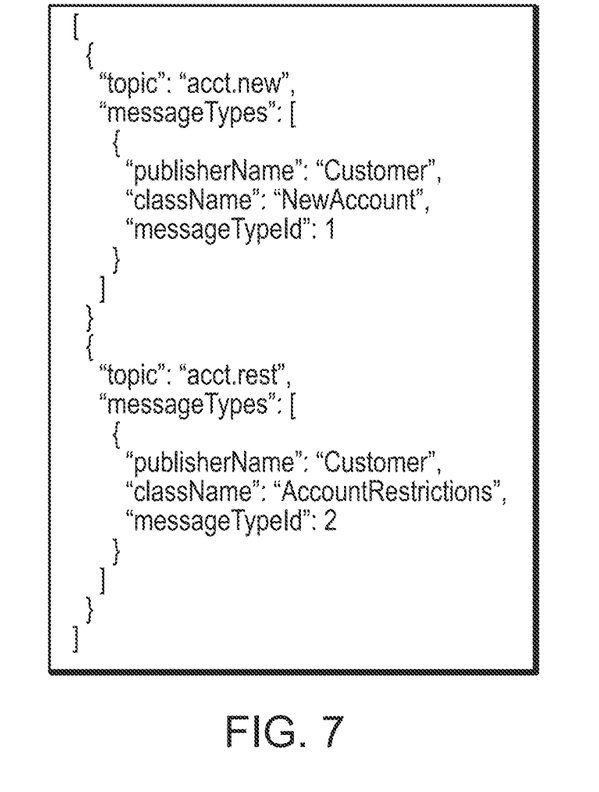
FIG. 7 shows an exemplary JSON configuration file associated with a message routed to the audit micro service from the trading platform.

An exemplary JSON configuration file associated with a message routed to the audit micro service from the trading platform is shown in FIG. 7. As shown, the JSON file lists two topics and a class name attribute for each topic.

Once routed 205 to the audit micro service, the audit micro service reads the JSON file 207 and, for each topic, maps 209 the corresponding class name attribute to a protocol buffer to determine consumer attributes for the corresponding class name attribute. Returning to the exemplary JSON file in FIG. 7, the audit micro service reading the JSON file understands that needs to build two consumers, one for topic "acct.new" and another for topic "acct.rest". Reading further through the "className" attribute, the audit micro service is able to use that information to map the consumer topic name to a protocol buffer data format that is serialized. Based on the protocol buffer, the audit micro service can identify which attributes it needs to build a message consumer.

Figure 8:
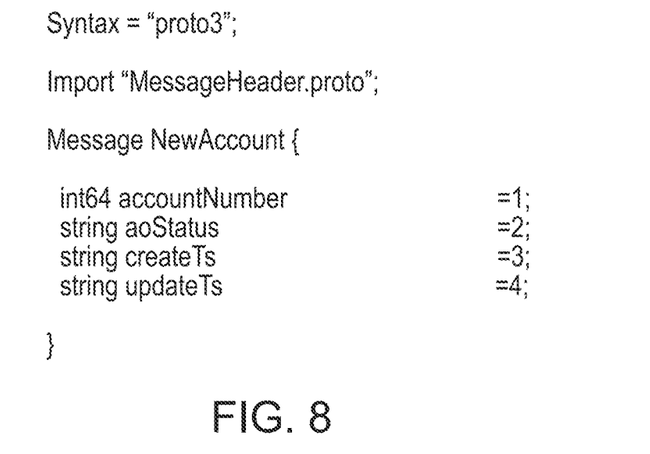
FIG. 8 shows an exemplary protocol buffer according to certain embodiments.

An exemplary protocol buffer is shown in FIG. 8. In that example, the protocol buffer instructs the audit microservice that the consumer for the topic "acct.new" should have the following attributes: accountNumber of type int64, aoStatus of type string, createTs of type string, and updateTs of type string.

Once the audit micro service has read the JSON configuration file and determined the required consumer attributes based on the protocol file, it can create 211 or build a consumer for each topic comprising the determined consumer attributes. The message consumer can be based on a code template that accounts for both the JSON configuration file and the protocol file to output a compiled executable that is operable to consume messages passing through the trading platform and deserialize and store those messages in human readable format in a data store.

Figure 3:
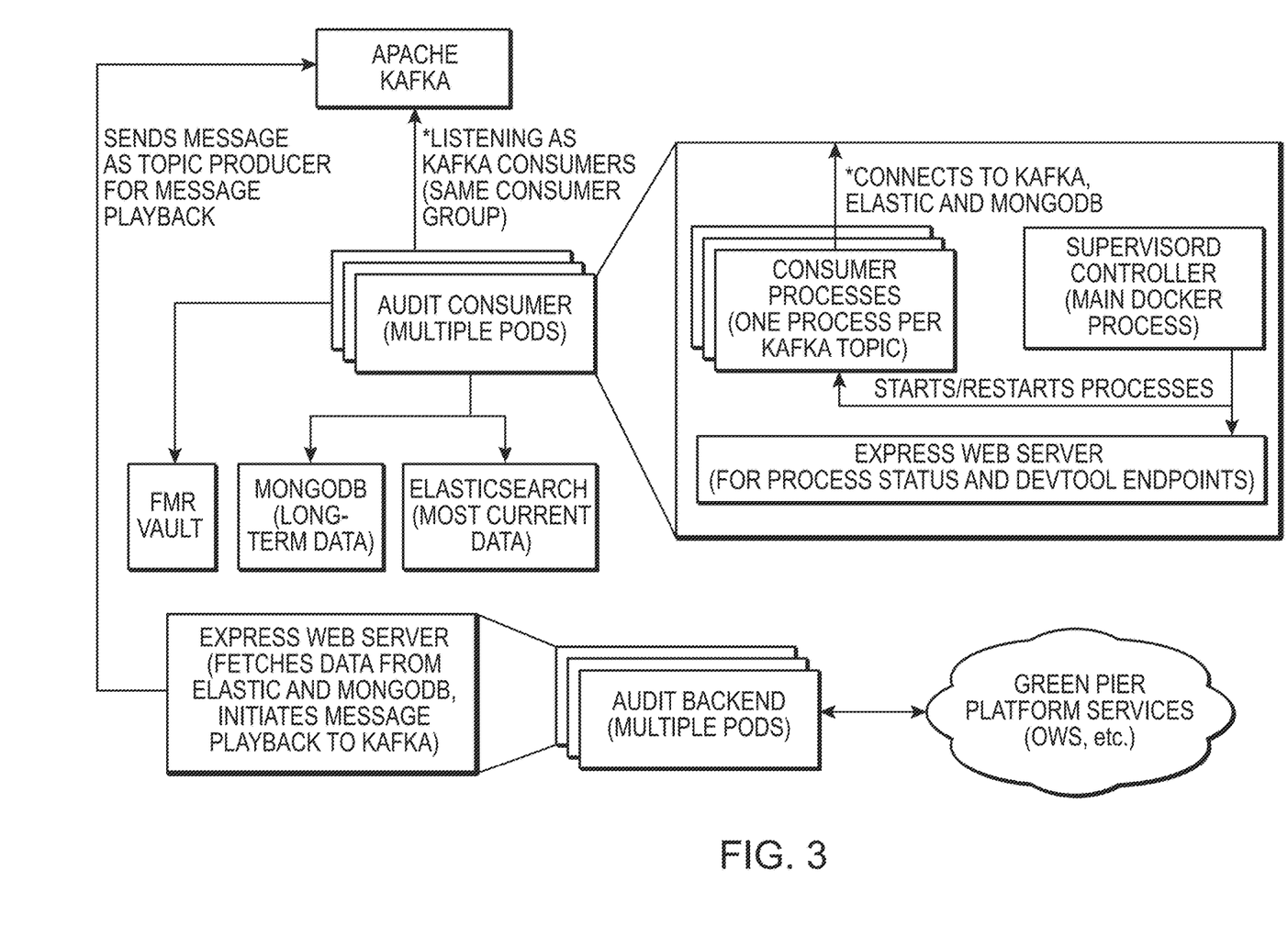
FIG. 3 provides a technical diagram of an exemplary audit service according to certain embodiments.

FIG. 3 provides a technical diagram of an exemplary audit service according to certain embodiments. As depicted, the service can be a web server connected to a database and/or search tool such as MongoDB (MongoDB Inc.) and Elasticsearch (Elasticsearch B.V.). The web server can have endpoints that run queries against the message databases. The web server may also retrieve statuses from audit consumers and initiate message playback if desired.

In certain embodiments, systems and methods of the invention can use a stream processing platform such as Apache Kafka to handle message feeds. Each consumer can be generated from a template file for a specific Kafka topic. These topics may be defined by an "audit-to-topic-mapper.json" file as discussed above. Each consumer can run in its own process and subscribe as a consumer to the Kafka cluster. The consumer processes may be managed by a client/server system such as supervisor daemon or supervisord, a process manager that can restart any processes that fail unexpectedly. In cases of appropriate exits, the Supervisor can take no action. In various embodiments, the web server may be operable (e.g., through Supervisor) to return the status of the consumers, accepts requests to "play back" Kafka messages, allow an administrator to produce an original message for a specific topic, and/or re-process previously saved messages into a newer format among.

In certain embodiments, systems and methods of the invention may be implemented by generating custom protocol buffer files for the various class name attributes, generating consumer source files, transpiling as a TypeScript project to JavaScript, and moving all non-TypeScript files to proper locations (e.g. Bash scripts, file templates, etc.). In various embodiments, these build stages can be run individually via NPM scripts. The build step can happen at app runtime in certain embodiments where the step depends on values set in environment variables. The custom protocol common code can extract a human-readable value out of the enum used by individual consumer class. In some embodiments, handlebars may be used as the text templating system for generating the consumer source files.

Figure 4:
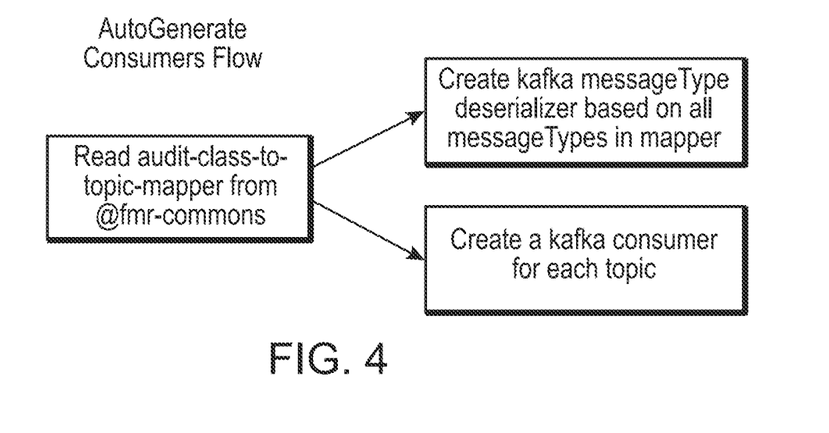
FIG. 4 shows an exemplary flow for autogenerating message consumers.

FIG. 4 shows an exemplary flow chart for autogenerating message consumers, the audit micro service accesses an audit-class-to-topic-mapper JSON file and creates a Kafka deserializer based on all message types in the JSON mapper as well as creating a Kafka consumer for each topic.

Figure 5:
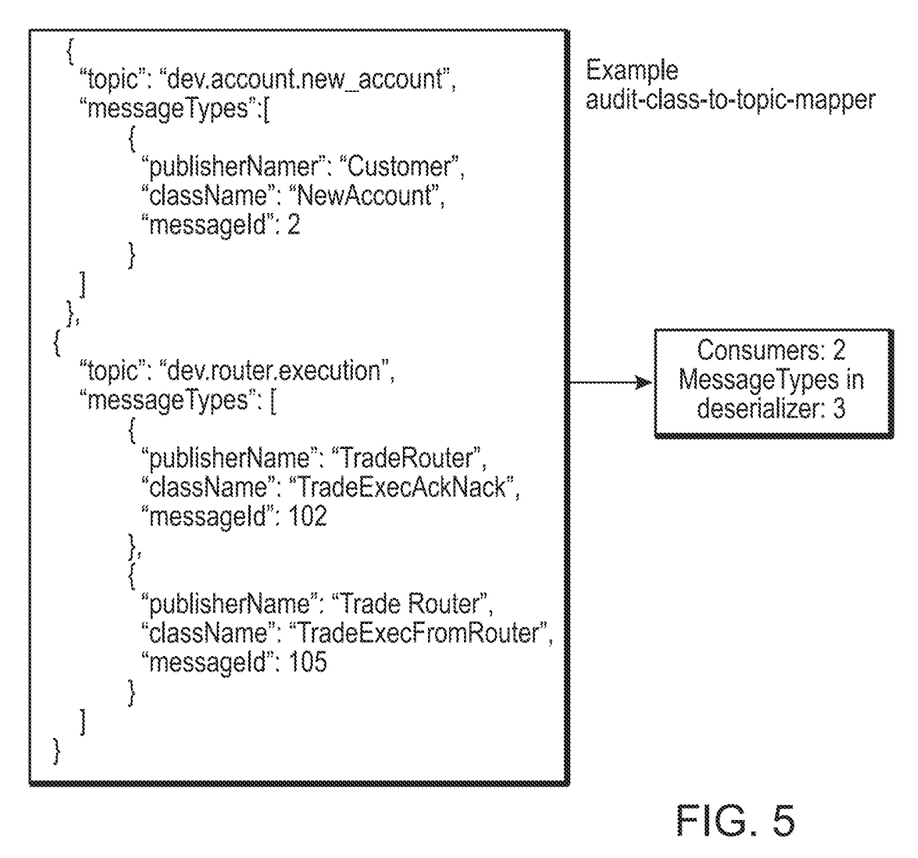
FIG. 5 shows an exemplary audit-class-to-topic mapper JSON file.

FIG. 5 shows an exemplary audit-class-to-topic-mapper JSON file. The audit microservice, reading the audit-class-to-topic-mapper JSON file identifies two topics, "trade.order" and "trade.execution". It therefore will build two message consumers. It further identifies three class name attributes, "TradeOrder" under the topic "trade.order" and both "TradeExecutionAck" and "TradeExecution" under the topic "trade.execution. The audit microservice can therefore access the protocol buffer for each of the class name attributes in order to build the two consumers which will then be operable to deserialize a total of three different message types across the two topic consumers.

Figure 6:
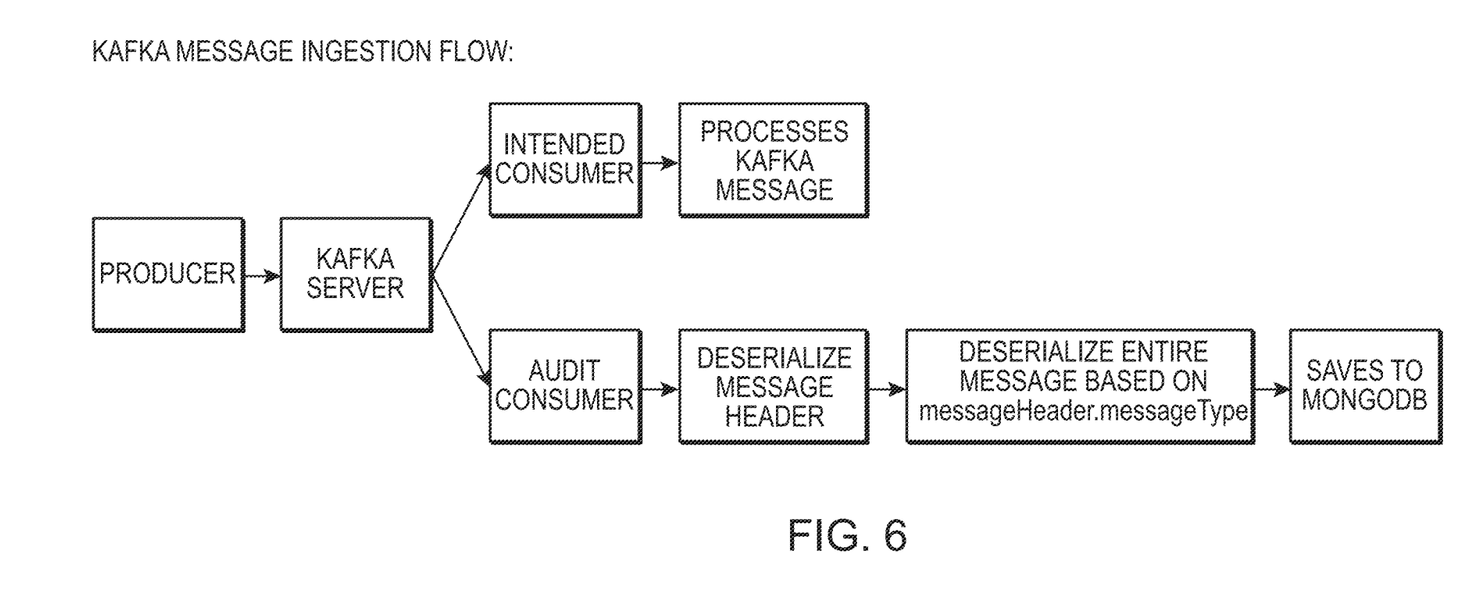
FIG. 6 illustrates an exemplary Kafka message ingestion flow by a generated message consumer according to certain embodiments.

FIG. 6 illustrates an exemplary Kafka message ingestion flow by a generated message consumer according to certain embodiments. The Kafka server receives a message from a producer and then routes that message to both the intended consumer to be processed (e.g., execution of a trade order) as well as the audit consumer which will deserialize the message into human readable format and save in a database for review, replay, or further manipulation as discussed above.

In various embodiments, systems and methods of the invention can be used to replay messages. The ability of an audit node to replay any message that was sent to the trading platform can be extremely powerful. The following are two exemplary methods by which a message can be replayed. First, an operation user may select from a screen a message that needs to be replayed. Because the audit micro service saves the message in human readable format, the messages can be displayed and read by a user for easy selection. Once the user selects the message, they may initiate replay of that message by, for example, clicking a replay button on the interface. Then the program can read all its attributes, which topic it belongs to, and invoke a produce command to replay the message. In some embodiments, a user may select through the user interface a given timeframe and instruct the audit micro service to replay all messages for that given timeframe.

Figure 9:
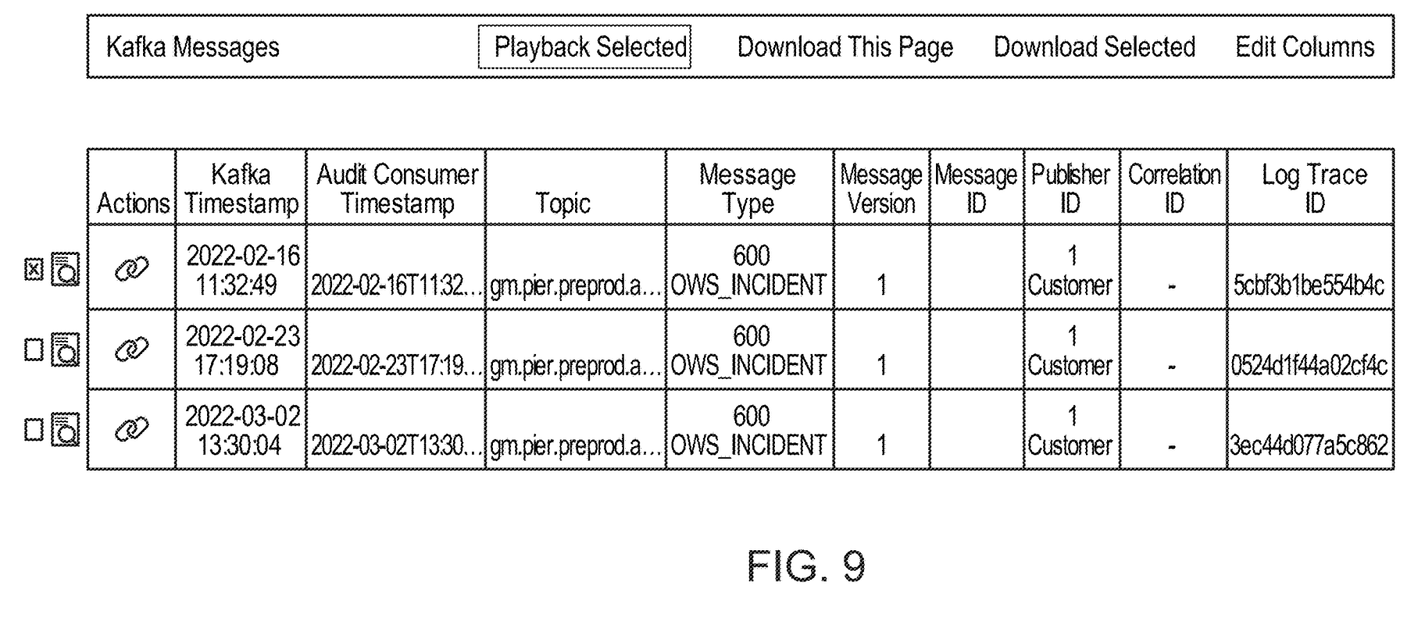
FIG. 9 illustrates an exemplary user interface for reviewing cataloged messages.
Figure 10:
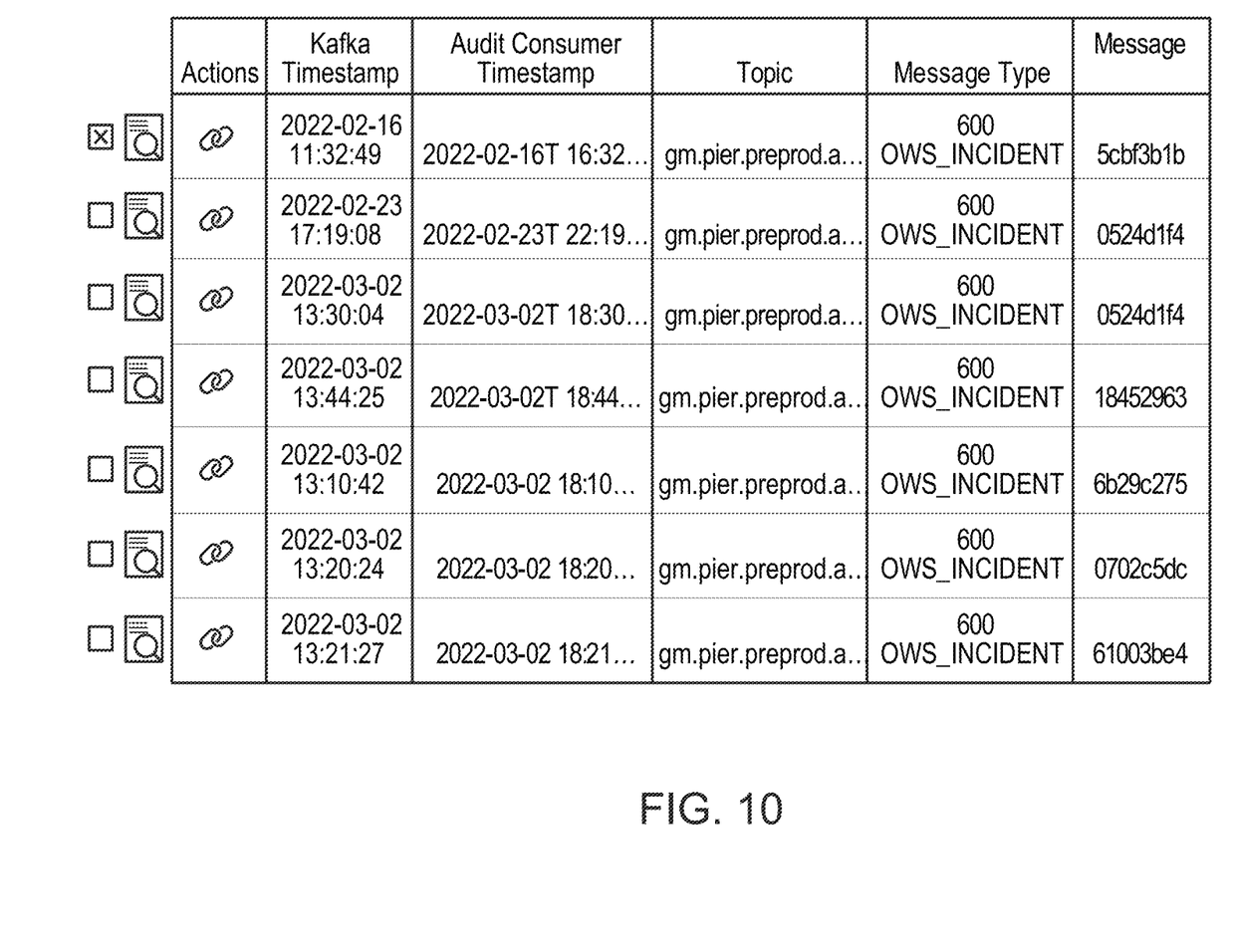
FIG. 10 illustrates exemplary attributes being displayed in the user interface for a selected message.
Figure 11:
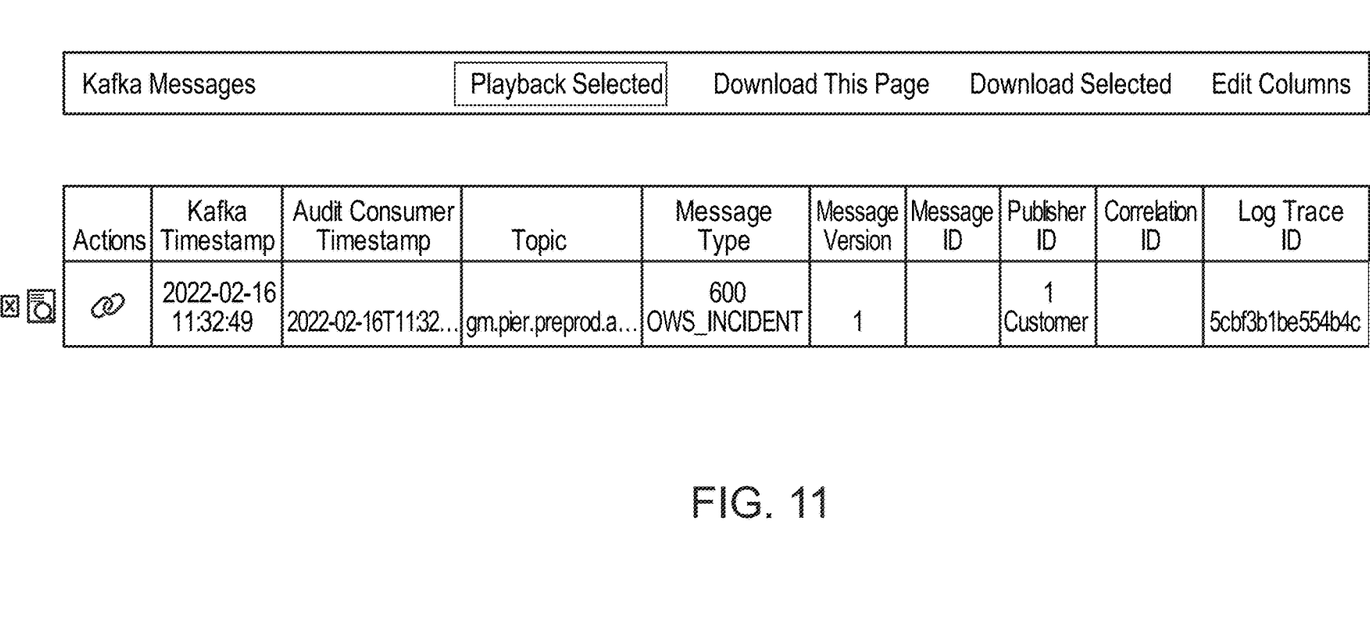
FIG. 11 shows an exemplary message selected via the user interface for replay.

FIG. 9 illustrates an exemplary user interface for reviewing cataloged messages. FIG. 10 illustrates exemplary attributes being displayed in the user interface for a selected message. FIG. 11 shows an exemplary message selected via the user interface for replay.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile computing device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method for automatic monitoring and cataloging of messages:
    providing an audit micro service in electronic communication with a trading platform;
    routing messages comprising a JavaScript Object Notation (JSON) file from the trading platform to the audit micro service, wherein the JSON file comprises one or more topics and a corresponding class name attribute for each topic;
    reading the JSON file with the audit micro service;
    for each topic, mapping, with the audit micro service, the corresponding class name attribute to a protocol buffer to determine consumer attributes for the corresponding class name attribute; and
    creating, with the audit micro service, a consumer for each topic comprising the determined consumer attributes, wherein the consumer is a compiled executable operable to receive, deserialize, and store messages in a searchable database in human readable format.

2. The computerized method of claim 1, further comprising resending an individual message stored in the searchable database to execute intended operations of the individual message.

3. The computerized method of claim 2, further comprising resending a plurality of messages stored in the searchable database based on a selected timeframe in which the plurality of messages were originally sent within the trading platform.

4. The computerized method of claim 2, wherein the individual message failed to execute its intended operation when originally sent within the trading platform.

5. The computerized method of claim 2, further comprising verifying that the individual message failed to execute its intended operation when originally sent within the trading platform before resending the individual message.

6. The computerized method of claim 1, further comprising providing a user interface displaying the searchable database of stored messages in human readable format.

7. The computerized method of claim 1, wherein the protocol buffer comprises a serialized data format for translating messages of the corresponding class name.

8. The computerized method of claim 1, further comprising monitoring status of the created consumers.

9. The computerized method of claim 8, further comprising automatically restarting the created consumers after unexpected failure.

10. The computerized method of claim 1, wherein deserializing messages in the searchable database in human readable format comprises first deserializing a header of the messages and then deserializing the entire message based on a message type read from the deserialized header.

11. A computer system for automatic monitoring and cataloging of messages, the system comprising:
    an audit micro service; and
    a computerized trading platform operable to route messages comprising a JavaScript Object Notation (JSON) file from the trading platform to the audit micro service, wherein the JSON file comprises one or more topics and a corresponding class name attribute for each topic;
    wherein the audit micro service is operable to:
        read the JSON file;
        for each topic, map the corresponding class name attribute to a protocol buffer to determine consumer attributes for the corresponding class name attribute, and
        create a consumer for each topic comprising the determined consumer attributes, wherein the consumer is a compiled executable operable to receive, deserialize, and store messages in a searchable database in human readable format.

12. The computer system of claim 11, wherein the audit micro service is further operable to resend an individual message stored in the searchable database to execute intended operations of the individual message.

13. The computer system of claim 12, wherein the audit micro service is further operable to resend a plurality of messages stored in the searchable database based on a selected timeframe in which the plurality of messages were originally sent within the trading platform.

14. The computer system of claim 12, wherein the audit micro service or the trading platform is further operable to determine when the individual message failed to execute its intended operation when originally sent within the trading platform.

15. The computer system of claim 12, wherein the audit micro service is further operable to verify that the individual message failed to execute its intended operation when originally sent within the trading platform before resending the individual message.

16. The computer system of claim 11, further comprising a user interface operable to display the searchable database of stored messages in human readable format.

17. The computer system of claim 11, wherein the protocol buffer comprises a serialized data format for translating messages of the corresponding class name.

18. The computer system of claim 11, wherein the audit micro service is further operable to monitor status of created consumers.

19. The computer system of claim 18, wherein the audit micro service is further operable to automatically restart the created consumers after unexpected failure.

20. The computer system of claim 11, wherein deserializing messages in the searchable database in human readable format comprises first deserializing a header of the messages and then deserializing the entire message based on a message type read from the deserialized header.

* * * * *